United States Patent [19]

Buri et al.

[11] 4,437,292

[45] Mar. 20, 1984

[54] APPARATUS FOR SEALING CONTAINERS

[75] Inventors: Hermann Buri; Beat Karth, both of Kirchberg, Switzerland

[73] Assignee: Nyffeler, Corti AG, Berne, Switzerland

[21] Appl. No.: 262,699

[22] Filed: May 11, 1981

[30] Foreign Application Priority Data

May 23, 1980 [DE] Fed. Rep. of Germany ... 8014020[U]

[51] Int. Cl.³ .................................................. B67B 7/28
[52] U.S. Cl. ........................................ 53/357; 53/324
[58] Field of Search ................. 53/324, 357, 328, 329, 53/488

[56] References Cited

U.S. PATENT DOCUMENTS 3,858,665 1/1975 Winker ............................ 267/162 X

FOREIGN PATENT DOCUMENTS 2019310 10/1979 United Kingdom .

Primary Examiner—A. J. Heinz
Attorney, Agent, or Firm—Peter L. Klempay

[57] ABSTRACT

A heatable sealing head includes resilient, yielding cup springs which transmit pressure and heat to a thin cover insertable between the sealing head and the container rim. This cover, which may be metallic and is coated on the underside with a thermoplastic material, is thereby deformed about portions of the container rim. The cup springs are disposed conically in their relaxed state so that their radially outer portions are situated closer to the cover than their radially inner portions, by which they are fixed to the sealing head. For increasing the flexibility of the cup springs, a spacer piece is inserted between an outer cup spring facing the cover and at least one cup spring nearer the sealing head in order to keep the radially inner portions of these two cup springs spaced from one another while leaving a clearance space between the radially outer portions of the spaced cup springs.

7 Claims, 6 Drawing Figures

APPARATUS FOR SEALING CONTAINERS

This invention relates to apparatus for sealing the mouths of containers, especially glass containers, by means of a thin cover, particularly a metallic cover, which is provided on the side thereof facing the rim of the container with a coating of thermoplastic material, and more particularly to apparatus of the type comprising a heatable sealing head having a resiliently yielding pressing element for transmitting pressure and heat to the cover, which is insertable between the sealing head and the container rim, for the purpose of deforming the cover about portions of the container rim, and including cup springs disposed conically in their relaxed state in such a way that the radially outer portions thereof are situated closer to the cover than the radially inner portions thereof by which they are fixed to the sealing head.

U.K. published patent application No. 2 019 310 A describes apparatus of this kind having a heatable sealing head and, fixed to the bottom thereof, a yielding element by means of which the sealing head presses upon a cover preferably of aluminum foil, set upon the rim bounding the mouth of the container. By the transmission of pressure and heat via the resiliently yielding pressing element to the cover, not only is the cover deformed according to the configuration of the container rim, but a thermoplastic coating on the cover is also softened. The resiliently yielding pressing element is composed of two superposed cup springs, the one remote from the cover having radial slots along its outer edge. The arrangement of the cup springs is such that when the sealing head is set upon the cover lying on the container edge, they first act upon the outer margin of the cover since it is the outer margins of the cup springs which project the farthest downward from the sealing head. As the transmission of pressure increases, i.e., as the sealing head continues to approach the cover, the point of contact between the cup springs and the cover is gradually shifted inwards so that the transmission of pressure to the cover and the container rim is likewise shifted to locations situated inward of the original points of actions of the resiliently yielding pressing element upon the cover.

Although this apparatus has proved very useful, it has nevertheless been found desirable to increase the flexibility of the pressing member composed of the cup springs.

It is an object of the present invention to provide improved sealing apparatus in which such flexibility is increased in the simplest manner while at the same time providing simple means for achieving a still better fluid-tight bond between the cover and the container rim even when the container rim exhibits irregularities, as is usual in the case of glass.

To this end, in the apparatus according to the present invention, between an outer cup spring facing the cover and at least one cup spring nearer the sealing head there is inserted a spacer piece which keeps the radially inner portions of these cup springs spaced from one another while leaving a clearance space between the spaced cup springs in the region of the radially outer portions thereof.

An embodiment of the invention will now be described in detail, by way of example, with reference to the accompanying drawings, in which.

Figure 1:
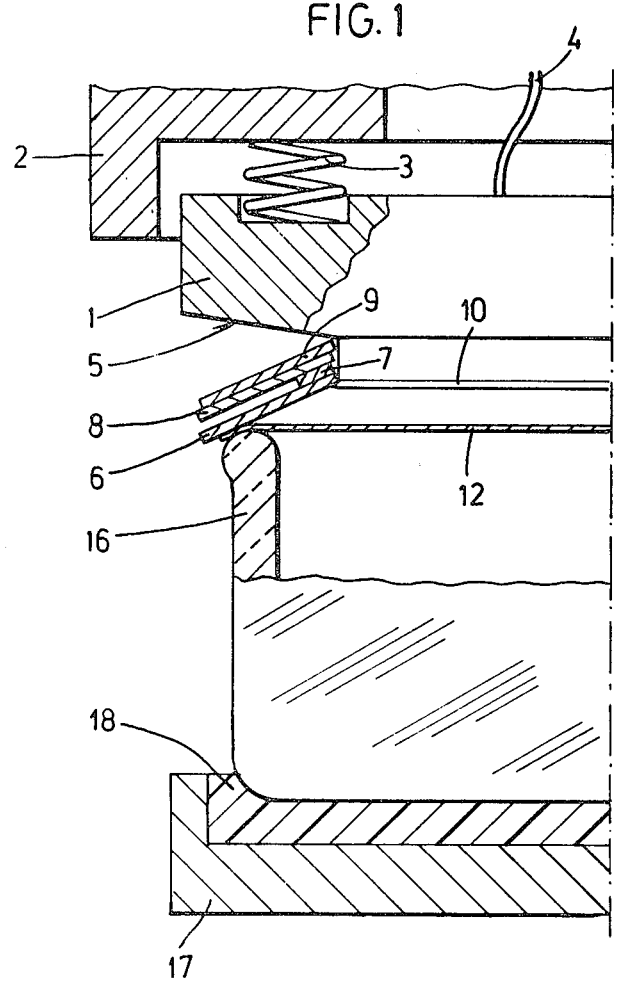
FIG. 1 is a diagrammatic elevation of the apparatus, partially in section.

FIG. 1 shows a sealing head 1 mounted in a holder 2 for both swivelling and axial movement by means of coil springs 3 which are fitted in recesses along the periphery of the sealing head 1 and braced against the underside of the holder 2. A conductor 4 leads to the sealing head 1 so that the latter can be heated, e.g., by fuel or by electric means. At the bottom of the sealing head 1 is a radially outer recess bounded at the top by a stop face 5. Slipped on about the radially inner cylindrical bounding face of the recess are cup springs 6, 7, 8, and 9 which are secured against axial displacement by the stop face 5, on the one hand, and by a retaining element 10, on the other hand. As may be seen in FIG. 1, the cup springs 6, 7, 8, and 9 are disposed in such a way that the radially outer portions 11 thereof (see also FIG. 3a) are axially the farthest down, i.e., pointing away from the sealing head 1, whereby the radially outer portion 11 of the axially outer or lowest cup spring 6 is the first to come in contact with a container cover 12.

Figure 3A:
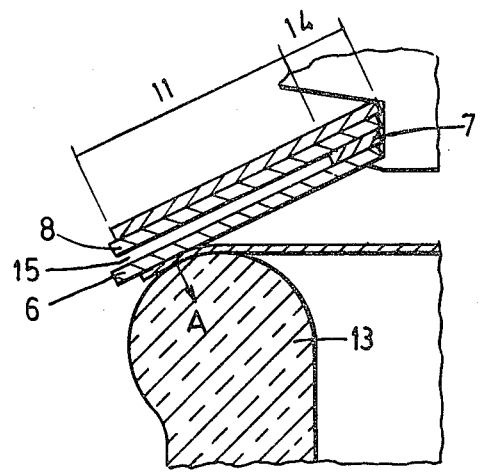
FIGS. 3a, 3b, and 3c are sectional views showing the application of force to the cover and container rim by the resiliently yielding element in three different positions of the latter at three different moments.

After the portion 11 of the cup spring 6 has come to rest against the cover 12, the latter is pressed, as is particularly apparent from FIG. 3a, against the surface of a rim 13 of a glass container 16 at a location corresponding to the pressure-transmission arrow A. Since the cup spring 6 also transmits heat from the sealing head 1 to the cover 12, the latter is heated until a coating of thermoplastic material (not shown) on the underside thereof is softened to such an extent that it improves the deformability of the cover 12 in the respective area and is better able to conform to so-called mini-irregularities in the relatively uneven glass container rim 13.

Figure 3B:
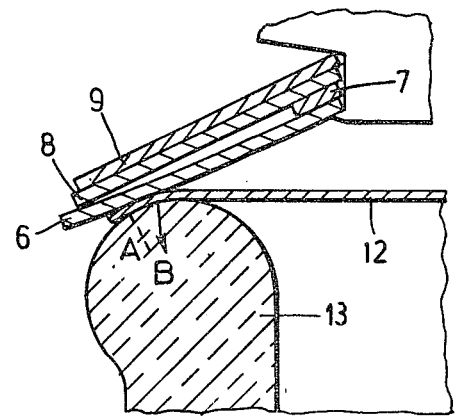

As the sealing head 1 continues to move axially downwards, the outer portions 11 of the outer cup spring 6 are increasingly forced back upwards—whereby the conicity of this cup spring 6 is somewhat lessened—until this outer margin 11 of the cup spring 6 butts against the outer margin of the cup spring 8, the radially inner portion 14 of which is kept spaced from the outer cup spring 6 by means of a spacer piece in the form of the further cup spring 7. At this moment, as may be seen in FIG. 3b, the point of pressure transmission is displaced from location A to location B, i.e., radially inwards.

Figure 3C:
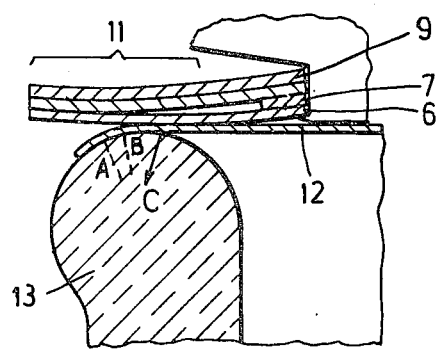

In the course of this displacement, the outer cup spring 6 is rolled substantially automatically over an annular region of the cover 12; at this time, the pressure or force transmission takes place essentially linearly, or when viewed in cross-section point-wise, whereby an optimum transmission of force and hence deformability is possible. As the axial movement of the sealing head 1 continues, the cup springs 8 and 9 are also caused to bend back farther, at the maximum up to the stop face 5 of the sealing head 1. FIG. 3c shows a position in which the point of optimum transmission of force is symbolized by arrow C. Since not only the outer cup spring 6 but also the two other cup springs 7 and 8 spaced therefrom are to be bent back to a not inconsiderable extent, a greater force must be exerted here, and hence a greater force is also utilized for deforming the cover 12.

Figure 4:
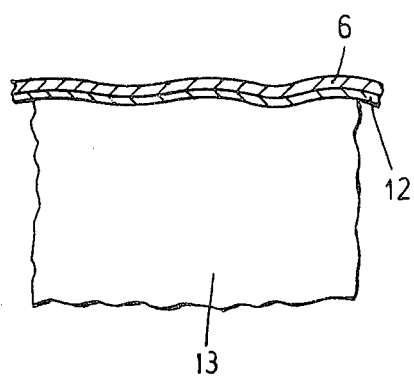
FIG. 4 is a diagrammatic side view of part of the container rim.

The result of this roll-on method without the use of actual rolling members such as rollers, cylinders, or the like is an excellent adaptation of the cover 12 to the unevenness of the container rim 13, as is made particularly plain in FIG. 4. Precisely because the radially outer portion 11 of the outer cup spring 6 is itself relatively easily deformable, the cover 12, too, can be better and more uniformly pressed into depressions or troughs extending round about the container rim 13. The resiliently yielding pressing element substantially forms a kind of "floating cushion" without necessitating the use of hydraulic means and an elastic diaphragm limiting the hydraulic fluid. Consequently, the apparatus according to the invention is also distinguished by increased sturdiness.

Figure 2:
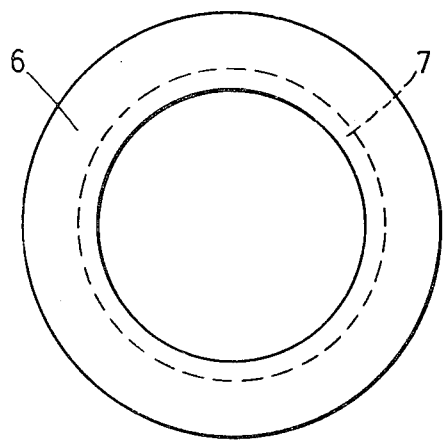
FIG. 2 is a diagrammatic top plan view of the cup spring 30 assembly on a smaller scale.

As shown in FIG. 2, the cup springs are annular, and the cup spring 7 serving as a spacer piece is naturally much smaller in outside diameter than the other cup springs 6, 8, and 9.

The container 16 is supported by a counterpressure plate 17. It is advisable to insert a resilient mass 18 between the bottom of the container 16 and the counterpressure plate 17 in order to lessen the danger of breakage of the glass container 16. After the sealing head 1 is withdrawn, i.e., lifted, the cup springs 6, 8, and 9, and to a certain extent the cup spring 7 as well, bend back into their original state, so that a clearance space 15 between the cup springs 6 and 8 in the region of their radially outer portions 11 is restored.

The embodiment described represents a considerable improvement over the prior art in that when the outer cup spring begins to act upon the cover and upon the radially outer region of the rim of the container mouth, this cup spring can be resiliently bent back fairly easily before it touches the next cup spring spaced therefrom, so that then any further bending back of the first mentioned, outer cup spring cannot occur without simultaneous bending back of the other cup springs nearer the sealing head, for which purpose, however, a greater force is necessary. Thus, owing to the design of the apparatus according to the invention, the sealing head first acts upon the cover, via the resiliently yielding pressing element, with relatively little force which nevertheless suffices to deform the cover in such a way that it conforms to irregularities of the rim about the mouth of the container. As the sealing head continues to be lowered and the pressing element accordingly presses further against the cover to be deformed, the transmission of force becomes greater owing to intensification by means of the other, spaced cup springs, so that even greater deforming forces can then be transmitted in a region situated radially inward of the initial region of force transmission.

It is particularly advisable to mount the sealing head movably relative to its holder, especially to allow a swivel movement, since non-uniformity in the depth or height of the container can then be better compensated for axially, or in other words, the transmission of force from the sealing head to the cover to be deformed and sealingly attached to the container takes place as uniformly as possible in all regions of the container rim.

What is claimed is:

1. Apparatus for sealing a thin cover coated with thermoplastic material to a rim of a container, of the type comprising a heatable sealing head and a resiliently yielding pressing member together adapted for transmitting pressure and heat to said cover, said pressing member including two or more superposed cup springs having radially inner portions fixed to said sealing head and radially outer portions, said cup springs having a relaxed state, in which said springs are conically disposed with said radially outer portions being spaced axially outwardly of said sealing head, wherein the improvement comprises:

a spacer piece disposed between said radially inner portions of the one of said cup springs remotest from said sealing head and of at least another one of said cup springs, said spacer piece having a smaller outside diameter than said one of said cup springs, whereby a clearance space is created between said cup springs.

2. The apparatus of claim 1, wherein said spacer piece takes the form of a further cup spring having a considerably smaller outside diameter than the other said cup springs.

3. The apparatus of claim 2, further comprising a reinforcing cup spring disposed between said another one of said cup springs and said sealing head.

4. The apparatus of claim 2, wherein said sealing head includes a stop surface facing said cup springs.

5. Apparatus as in any one of the preceding claims, further comprising a holder for said sealing head and means for mounting said sealing head movably relative to said holder.

6. The apparatus of claim 5, wherein said means for mounting said sealing head include coil springs.

7. The apparatus of claim 1, wherein said cover is a metallic cover and said container is a glass container.

* * * * *